(12) United States Patent
Avillan-Carrion

(10) Patent No.: US 9,774,177 B1
(45) Date of Patent: Sep. 26, 2017

(54) CABLE DISTRIBUTION ASSEMBLY

(71) Applicant: Daniel Avillan-Carrion, Norcross, GA (US)

(72) Inventor: Daniel Avillan-Carrion, Norcross, GA (US)

( * ) Notice: Subject to any disclaimer, the term of this patent is extended or adjusted under 35 U.S.C. 154(b) by 394 days.

(21) Appl. No.: 14/681,802

(22) Filed: Apr. 8, 2015

Related U.S. Application Data

(60) Provisional application No. 61/977,680, filed on Apr. 10, 2014.

(51) Int. Cl.
*H02G 9/00* (2006.01)
*G02B 6/44* (2006.01)

(52) U.S. Cl.
CPC ............ *H02G 9/00* (2013.01); *G02B 6/4457* (2013.01)

(58) Field of Classification Search
CPC ................................ H02G 9/00; G02B 6/4457
See application file for complete search history.

(56) References Cited

U.S. PATENT DOCUMENTS

| | | | | |
|---|---|---|---|---|
| 3,323,704 A | * | 6/1967 | Hannis ................ | B29C 47/0016 226/180 |
| 3,618,900 A | * | 11/1971 | Sowards ................ | H02G 11/02 226/196.1 |
| 4,989,582 A | * | 2/1991 | Sakiyama ............... | A61B 1/042 348/65 |
| 6,109,561 A | * | 8/2000 | Haines ..................... | H02G 1/08 242/598.3 |
| 6,533,248 B1 | * | 3/2003 | Schafer .................. | B65H 49/32 254/134.3 FT |
| 6,811,112 B1 | * | 11/2004 | Currie ................. | B65H 54/2872 242/157.1 |
| 2015/0353319 A1 | * | 12/2015 | Henderson ........... | H02G 3/0456 248/68.1 |

* cited by examiner

*Primary Examiner* — Sang Kim
(74) *Attorney, Agent, or Firm* — H. John Rizvi; Gold & Rizvi, P.A.

(57) ABSTRACT

A cable distribution assembly is operable to reel in and pay out a cable through a bore. The alignment of the cable in relation to the cable distribution assembly adjusts to restrict contact between the cable and the bole edge. In this manner, friction between the cable and the bore edge, which may damage the cable, is restricted. A base positions adjacent to the bore, aligning the cable in relation to the bore edge. The base includes a concave contour that enables the cable to pass next to the base from a roller that carries the cable through the bore. A shaft drives the roller. Shaft regulators adjustably move horizontally and vertically along a shaft slot in a sidewall to dictate the position of the shaft and the roller that carries the cable. Fasteners secure the shaft regulator into place. A monitoring device provides information on the use of the assembly.

20 Claims, 8 Drawing Sheets

CABLE DISTRIBUTION ASSEMBLY

CROSS-REFERENCE TO RELATED APPLICATION

This application claims the benefit of U.S. Provisional Patent Application Ser. No. 61/977,680, filed Apr. 10, 2014, which is incorporated herein in its entirety.

FIELD OF THE INVENTION

The present invention relates to a cable distribution assembly of the kind that controllably passes a cable through a bore on the ground or other surface, wherein the position of the cable distribution assembly in relation to the bore at least partially inhibits engagement between the cable and the bore edges.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is well known that a cable is a linear, flexible member used to contain wiring, hoist loads, anchor objects, and fasten multiple items. For electrical purposes, cables are provided with a metallic wiring capable of conducting an electric current. Wiring may be formed by a single wire or may include two or more wires running side by side and bonded, twisted, or braided together to form a single assembly. Cables often include a protective polymer sheath that protects the wiring from moisture and physical contact with exterior surfaces.

Often, the wires in a cable corrode. Corrosion degrades the useful properties of the cable and wires, including strength, appearance and permeability to liquids and gases. For underground wiring, corrosion is the gradual destruction of metals by chemical reaction with the environment. In an underground bore, the environments that cause corrosion may include gases, water, acids that contact wiring to create an electrochemical oxidation with the wires in reaction with an oxidant such as oxygen. Wiring is often comprised of a copper material. Copper resists corrosion from moisture, humidity, industrial pollution, and other atmospheric influences.

Electrical cables are used in a countless number of applications. In many instances, electrical cables are arranged below ground level, concealed from the human eye and protected from weather hazards. For instance, airport runway lighting systems, consisting of a series of light bars or strobe lights that extend along both sides of the runway, generally provide electricity and/or electric signals to the lamps by underground cables. The underground environment is potentially corrosive for the cables. Because of this, frequent maintenance and replacement of the cables must be carried out in order to guarantee that cables, and thus the runway lighting system, work in optimal conditions.

Normally, runway lamps are installed over a bore on the ground through which cables extend from the lamp towards the underground environment. Electrical wiring maintenance or installation is usually carried out by removing the runway lamp and allowing the cable to slide through the bore and into the underground environment or by pulling the wire out of the underground environment. When sliding in or out of the bore, cables are prone to deteriorate due to friction against the bore edges, thus shortening cable lifetime undesirably and increasing the number of cable maintenance and replacement operations. Frequent operations on the runway lighting system can adversely impact an airport's runway traffic and lead to important economic loss. In addition, premature deterioration of airport runway lighting cables may result in nonoperational lighting along the runway and in a serious safety hazard.

Accordingly, there remains a need in the art for a cable distribution system that controllably and easily guides a cable through a bore, while restricting contact between the wiring and the bore edges, for optimizing cable installation and removal from airport lighting systems or other applicable lighting systems.

SUMMARY OF THE INVENTION

The present invention overcomes the deficiencies of the known art and the problems that remain unsolved by providing a cable distribution assembly kind that can controllably pass a cable through a bore on the ground or other surface, wherein the position of the cable distribution assembly in relation to the bore at least partially inhibits engagement between the cable and a bore edge. The cable distribution assembly allows controllably inserting or removing cable including, without limitation, an electrical cable, wiring, a wire rope, an optical cable, fiber optics, a ribbon cable, a coaxial cable, a hose, and tubing.

Introducing a first embodiment of the invention, the present invention consists of a cable distribution assembly for controllably passing a cable through a bore on the ground or other surface, the cable distribution assembly including a support portion comprising a base supporting a pair of sidewalls spaced apart one from the other. One edge of the base extending between the sidewalls defines a concave contour; the concave contour delimits an inner space within. A shaft extends between the sidewalls and is rotatable with respect to the support portion about a longitudinal axis. A roller is coupled to the shaft and is rotatable with respect to the support portion. The roller and the shaft are positioned such that a vertical line tangent to a central portion of the roller lies within the inner space delimited by the concave contour defined by the base.

In a second aspect, the roller is affixed to the shaft and is jointly rotatable therewith with respect to the support portion.

In another aspect, the position of the shaft and the roller are adjustable with respect to the base.

In yet another aspect, the position of the shaft and the roller are vertically adjustable with respect to the base.

In a still further aspect, the position of the shaft and the roller are horizontally adjustable with respect to the base in a direction substantially perpendicular to the axis of rotation of the shaft.

In another aspect, each of the sidewalls defines a respective slot through which the shaft passes and further wherein the position of the shaft is adjustable within the slots.

In another aspect, the slots are arcuate.

In a still further aspect, the cable distribution assembly further includes a shaft end support on each end of the shaft wherein each shaft end support has an articulated first connection to a respective sidewall and a second connection engageable to different positions of the sidewall.

In yet another aspect, the base defines at least one hole therethrough proximate to a periphery of the concave contour for the insertion of fasteners to attach the base to a matching peripheral hole of the bore in the ground for securing the support portion to an edge of the bore.

In another aspect, the cable distribution assembly further includes a monitoring device operably connected to the shaft and configured to measure at least one parameter of a group consisting of the number of shaft rotations, angular velocity of the shaft, and length of a cable dynamically passed over the roller.

In another aspect, the roller comprises an external cable-retaining concave surface.

In still another aspect, the roller has an outer non-slip surface.

Introducing another embodiment of the invention, the present invention consists of a cable distribution assembly for controllably passing a cable through a bore in the ground, the cable distribution assembly including a support portion comprising a base supporting a pair of sidewalls spaced apart one from the other, wherein one edge of the base extending between the sidewalls defines a concave contour delimiting an inner space within, and wherein each sidewall defines a slot therein. A shaft extends between and is adjustable within the slots defined in the sidewalls and is rotatable with respect to the support portion about a longitudinal axis. A shaft end support is on each end of the shaft. Each shaft end support has an articulated first connection to a respective sidewall and a second connection engageable to different portions of the sidewall. A roller is affixed to the shaft and is rotatable with respect to the support portion. The roller and the shaft are positioned such that a vertical line tangent to a central portion of the roller lies within the inner space delimited by the concave contour defined by the base.

In a second aspect, the slots are arcuate.

In another aspect, the base defines at least one hole therethrough proximate to a periphery of the concave contour for the insertion of fasteners to attach the base to a matching peripheral hole of the bore in the ground for securing the support portion to an edge of the bore.

In yet another aspect, the cable distribution assembly further includes a monitoring device operably connected to the shaft and configured to measure at least one parameter of a group consisting of the number of shaft rotations, angular velocity of the shaft, and length of a cable dynamically passed over the roller.

Introducing yet another embodiment of the invention, the present invention consists of a cable distribution assembly for controllably passing a cable through a bore in the ground or other surface, including a support portion comprising a base supporting a pair of sidewalls spaced apart one from the other, wherein one edge of the base extends between the sidewalls and defines a concave contour. The concave contour delimits an inner space within. Each sidewall defines an arcuate slot therein. A shaft extends between and is adjustable within the slots defined in the sidewalls and is rotatable with respect to the support portion about a longitudinal axis. A shaft end support on each end of the shaft has an articulated first connection to a respective sidewall and a second connection engageable to different portions of the sidewall. A roller is affixed to the shaft and is rotatable with respect to the support portion wherein the roller and the shaft are positioned such that a vertical line tangent to a central portion of the roller lies within the concave contour defined by the base. A monitoring device is operably connected to the shaft and is configured to measure at least one parameter of a group consisting of a number of shaft rotations, angular velocity of the shaft, and length of a cable dynamically passed over the roller.

In a second aspect, the second connection includes a bolt passing through a hole defined by the shaft end support and further passing through a selected one of a plurality of holes defined in a respective sidewall for regulating the shaft in different positions.

In another aspect, the base defines at least one hole therethrough proximate to a periphery of the concave contour for the insertion of fasteners to attach the base to a matching peripheral hole of the bore in the ground for securing the support portion to an edge of the bore.

In yet another aspect, the roller has an outer non-slip concave surface.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
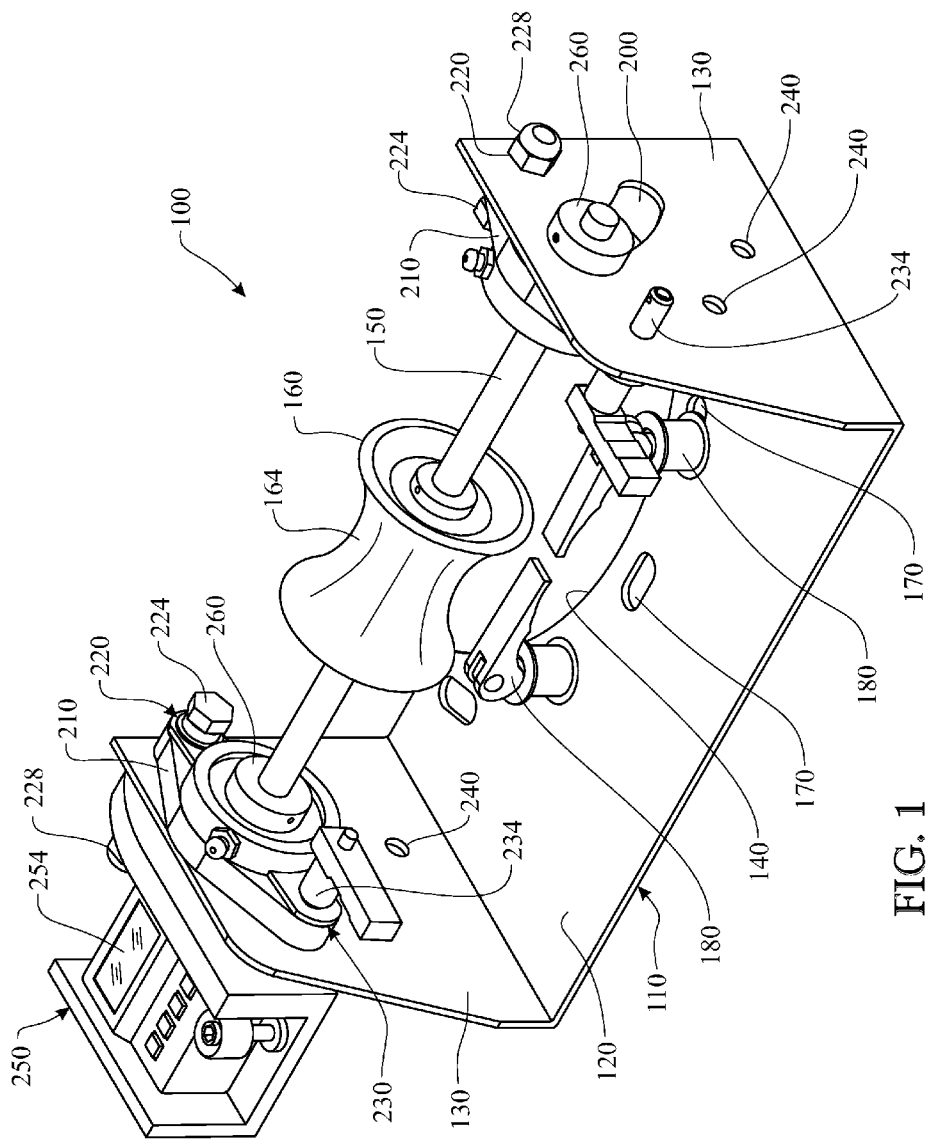
FIG. 1 presents a detailed perspective view of an exemplary cable distribution assembly according to the invention, viewed from a top front angle.
Figure 2:
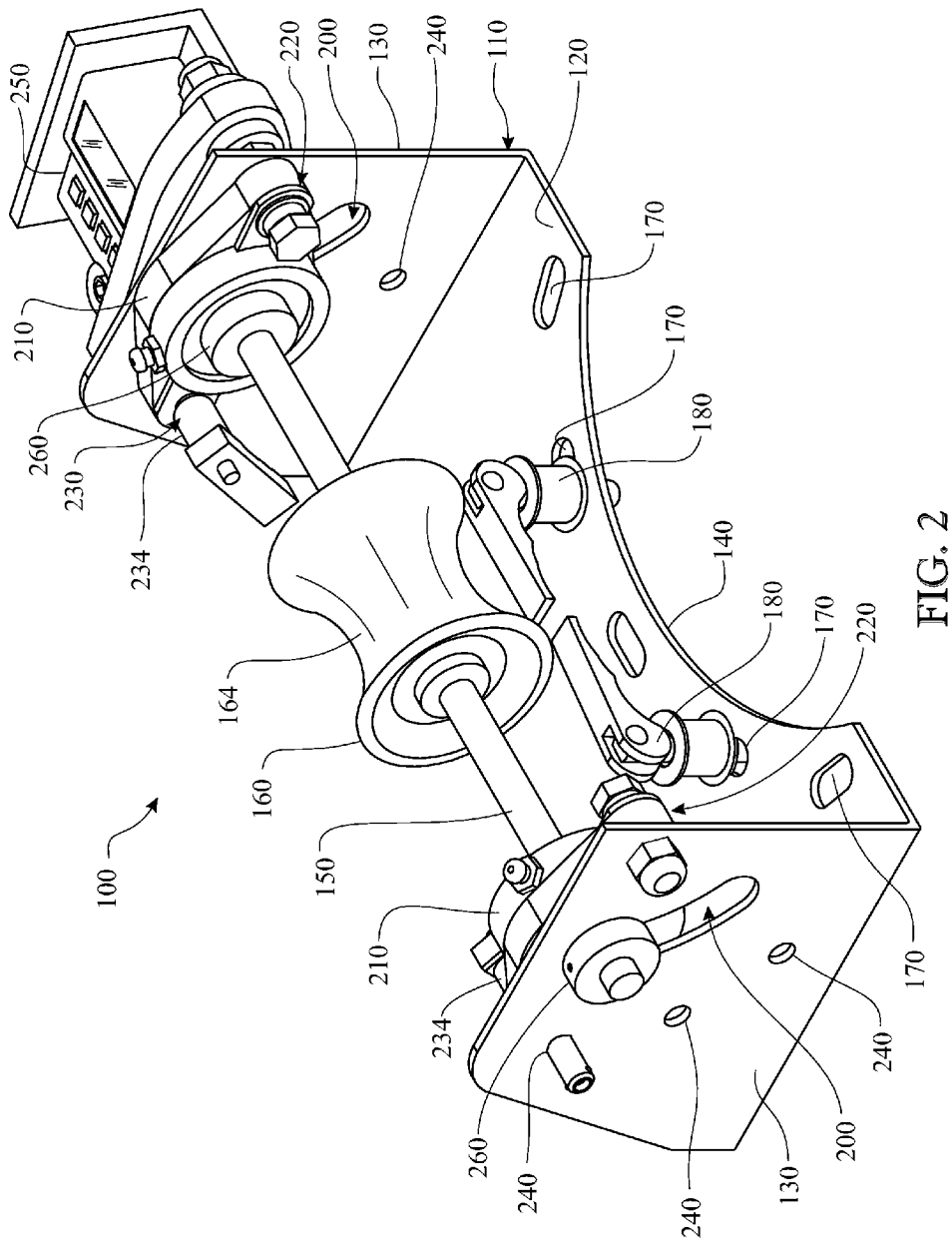
FIG. 2 presents a detailed perspective view of the cable distribution assembly of FIG. 1, viewed from a top rear angle.

The illustrations of FIGS. 1 and 2 present a first embodiment of a cable distribution assembly 100, shown from different angles. The cable distribution assembly 100 comprises a support portion 110, which forms a foundation for the cable distribution assembly 100. The support portion 110 includes a base 120 and a pair of sidewalls 130 that extend out from opposite ends of the base 120. The base 120 comprises a concave contour 140, configured to resemble the edge of a lighting system bore, which is usually round or curved. The cable distribution assembly 100 further comprises a shaft 150 that extends between the sidewalls 130. In the present embodiment, the shaft 150 is rotatable with respect to the sidewalls 130 and the base 120. In addition, the cable distribution assembly 100 comprises a roller 160, which in the present embodiment is coupled to the shaft 150 and rotatable jointly with the shaft 150. The roller 160 can include an external concave surface 164 on which a cable (not shown) can pass, the concave shape tending to retain the cable within. The cable distribution assembly 100 is configured so that the position of the shaft 150 and the roller 160 in relation to the concave contour 140 inhibits engagement between the concave contour 140 and a cable (not shown) that were passing transversally along the roller 160 and hanging downwards toward the concave contour 140.

Figure 3:
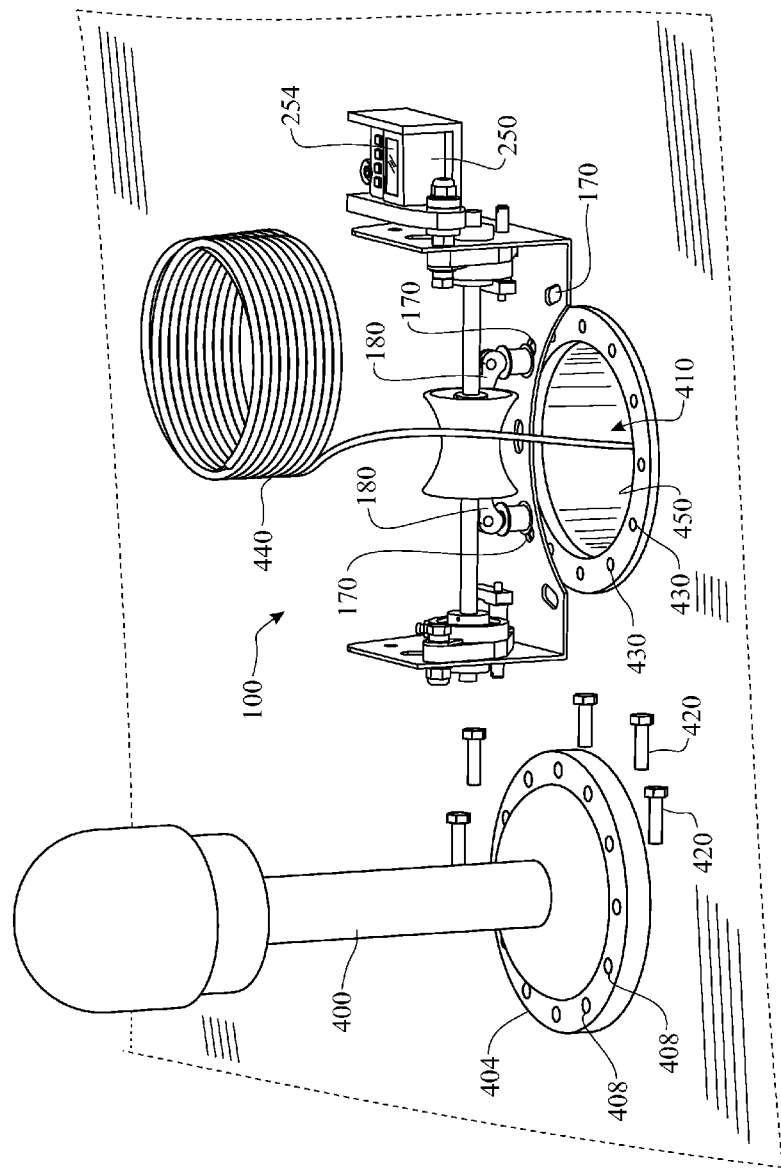
FIG. 3 presents a perspective view of the cable distribution assembly of FIG. 1, positioned over an exemplary airport runway lamp bore and having a cable passing through according to the invention.

The illustration of FIG. 3 shows the cable distribution assembly 100 being used, for instance, to install new cable in an airport runway lighting system. The lighting system comprises a runway lamp 400 of the kind that is normally arranged over a bore 410 on the ground, on either side of the runway. A base 404 of the lamp 400 is configured to cover the bore 410 when the lamp 400 is installed in normal operating conditions over the bore 410. In said normal operating conditions, the base 404 of the lamp 400 is secured to the ground by fastening a set of screws 420 through holes 408 in the base 404 and into corresponding peripheral holes 430 around the bore 410. Cables operating the lamp 400 are located at underground level and reach the lamp 400 through the bore 410 and the base 404. In the situation depicted in the figure, the screws 420 have been disconnected and the lamp 400 has been removed from the bore 410, providing access to the bore 410 in order, for instance, to pass a new cable 440 through the bore 410. As shown in the figure, the cable distribution assembly 100 of the present invention is advantageous in that it can be placed right on or at the bore 410. This advantageous effect is achieved at least partly by having the base 120 include the concave contour 140 that resembles the shape of the edge 450 of the bore 410. The cable distribution assembly 100 is configured so that the position of the shaft 150 and the roller 160 in relation to the concave contour 140 prevents the cable 440 passing transversally along the roller 160 from contacting the concave contour 140. Thus, the cable distribution assembly 100 according to the invention guarantees that the cable 440 does not contact the bore edge 450 when being rolled into or out from the bore 410, and that the insulation surrounding the inner electrical wiring does not deteriorate.

In the present embodiment, the base 120 of the cable distribution assembly 100 includes several through holes 170 configured to align with corresponding peripheral holes 430 along the bore edge 450. The through holes 170 are preferably elongated or slot-shaped, as better shown in FIGS. 1 and 2, to provide a mounting tolerance on the peripheral holes 430. Fasteners 180 can be installed through one or more through holes 170, as shown in FIGS. 1 and 2, and connected to the peripheral holes 430 of the bore 410 as shown in FIG. 3. The cable distribution assembly 100 can therefore be firmly secured to the bore 410, preventing the assembly from moving and varying its position with respect to the bore 410 while the cable 440 is being rolled. Having the assembly firmly secured guarantees that the assembly is always correctly positioned and that there is no risk that the cable 440 frictions against the edge 450 of the bore 410 when being rolled, thus enhancing the beneficial effects of the invention. A person skilled in the art will understand that the fasteners 180 can take the form of any applicable releasable mechanical fastener, such as a cam-handle screw as shown in the figures, a regular screw, a rod, etc. Preferably, fasteners 180 should allow for easy and quick fastening and unfastening, so that the task of installing or removing cables from a plurality of bores 410, such as along an airport runway having a string of lamps 400 and corresponding bores 410, can be carried out time efficiently.

Figure 4:
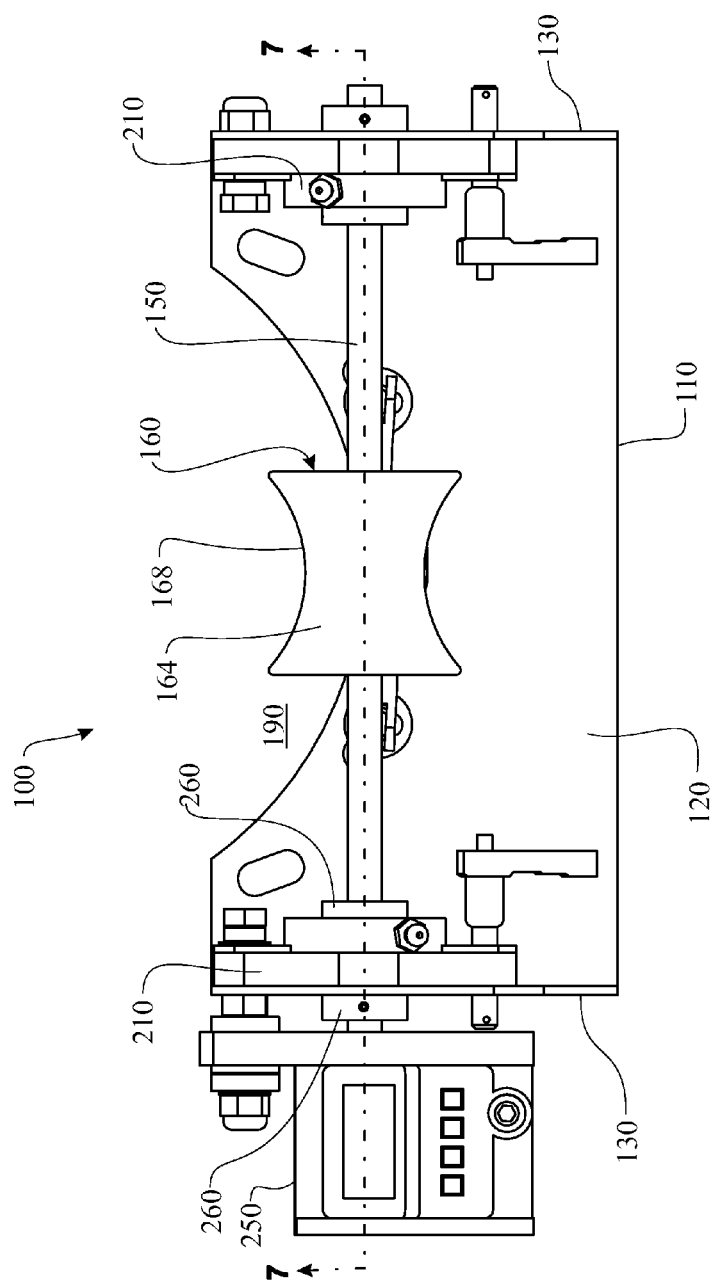
FIG. 4 presents a top view of the cable distribution assembly of FIG. 1.

The illustration of FIG. 4 shows a top view of the cable distribution assembly 100 of FIG. 1. As shown, the external concave surface 164 of the roller 160 includes a portion 168 that is arranged so that its horizontal projection, as shown in the figure, falls inside an inner space 190 delimited by the concave contour 140 of the base. Such an arrangement guarantees that a cable rolling vertically downward or upward along the roller 160 is directly inserted through the bore 410, neither contacting the bore edge 450 nor contacting the concave contour 140 of base 120—provided that the assembly is correctly placed on the bore—. Such an arrangement also provides a stable product that does not tend to fall over when cable 440 is being rolled.

Preferably, the shaft 150 can rotate in opposite directions. The assembly thus helps roll cable into the bore and also out of the bore.

Preferably, the position of the shaft 150 and roller 160 relative to the base 120 is adjustable. In the present embodiment, the shaft 150 and roller 160 are adjustable relative to the base 120 both horizontally and vertically. Vertical adjustment allows the cable to be rolled closer or farther apart from the base 120. Horizontal adjustment allows bringing the roller 160 closer or farther apart from the concave contour 140, so that the cable distribution assembly 100 adapts to different bore 410 sizes and to different cable 440 thicknesses. The invention contemplates alternative embodiments in which the shaft and roller are adjustable only horizontally or only vertically.

In the present embodiment, as shown in FIG. 2, the shaft 150 passes through respective slots 200 on each sidewall 130. The position of the shaft 150 along the slots 200 is adjustable. Having a shaft 150 adjustably connected along opposite slots provides a mechanically- and cost-effective solution for providing adjustability of the shaft 150 and roller 160 in relation to the base 120.

Figure 5:
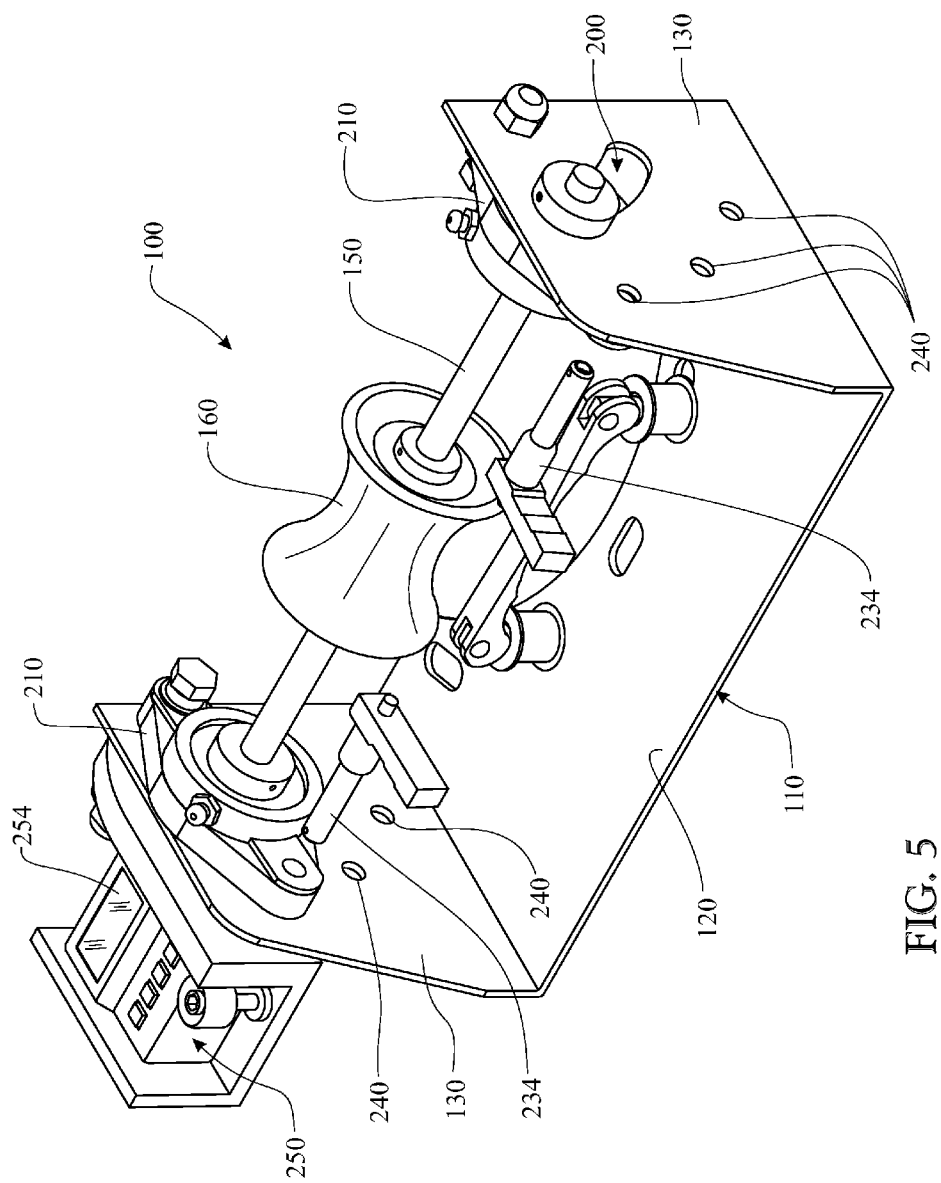
FIG. 5 presents another perspective view of the assembly of FIG. 1, wherein bolts have been pulsed out from opposite end shaft regulators in order to allow vertical and horizontal adjustment of the roller and shaft.
Figure 6:
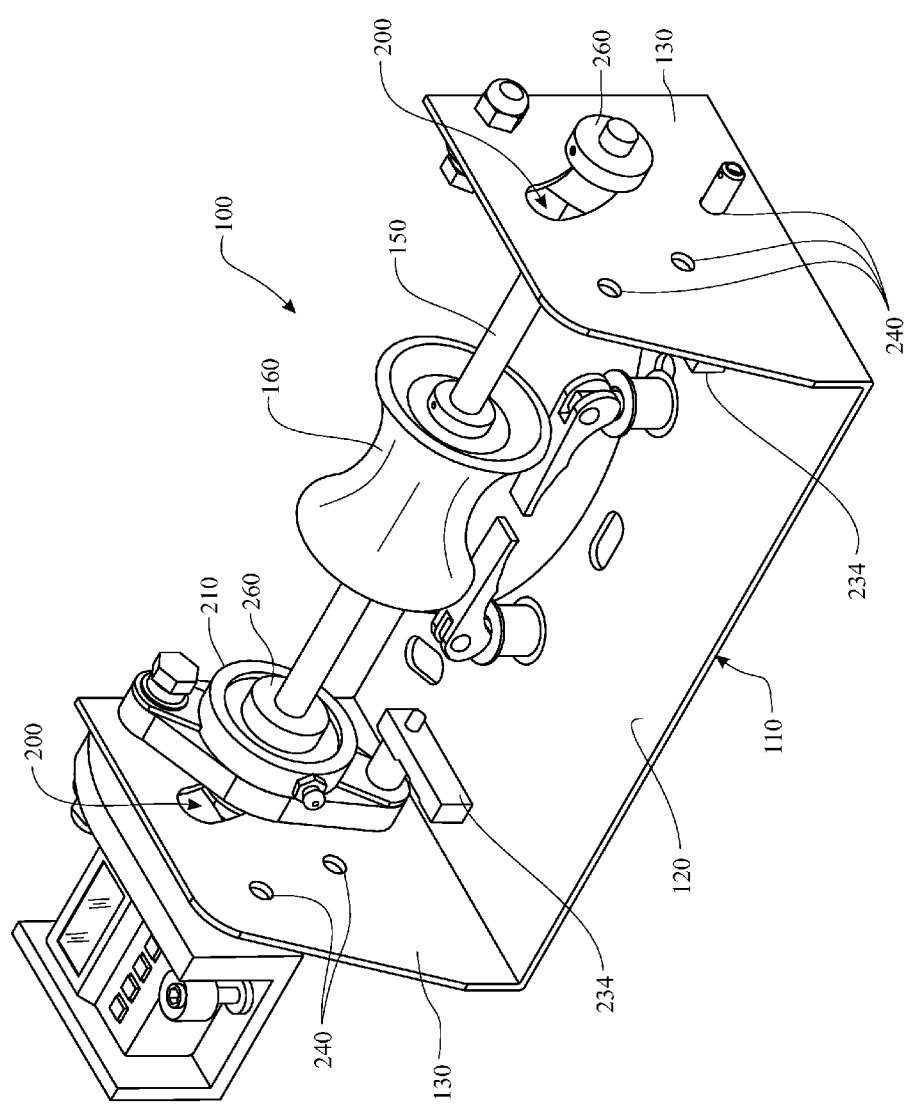
FIG. 6 presents the assembly of FIG. 5, where the shaft and roller have been adjusted to a lower position, and the bolts have been inserted in lower bolt apertures on the sidewalls, securing the shaft in the position of the figure.

As shown in FIG. 2, the slots 200 are shaped in form of an arc of a circle, providing an efficient solution for vertical and horizontal adjustability. In addition, the cable distribution assembly 100 further comprises shaft end supports 210 whose function is to rotatably support the shaft 150 and also to connect the shaft 150 to the sidewalls 130 allowing the shaft 150 to vary its position along the slots 200. A person skilled in the art will understand that the shaft end supports 210 preferably comprise internal rotation mechanisms such as bearings or the like, for providing rotational movement of the shaft 150 inside, and relative to, the shaft end supports 210. In addition, each shaft end support 210 comprises a first connection 220 to the sidewall 130 and a second connection 230 to the sidewall 130. The first connection 220 is an articulated connection, and in the present embodiment is formed by a screw 224 that passes through the shaft end support 210 and through a hole in the sidewall 130 and is secured by a nut 228 on the outer side of the sidewall 130. The second connection 230 is formed by a bolt 234 that passes through the shaft end support 210 and through a hole 240 in the sidewall 130. In order to provide vertical adjustability, the sidewall 130 comprises several holes 240 in which the bolt 234 of the second connection 230 can be inserted. The illustrations of FIGS. 5 and 6 show how these several holes 240 are used to adjust the position of the shaft 150. As shown in FIG. 5, the bolt 234 on each end of the shaft 150 can be pulled out of the hole 240 on the sidewall 130, freeing the shaft end support 210 so that it can rotate around the articulated first connection 230. In the figure, bolt 234 is shown completely pulled out of the shaft end support 210, but a person skilled in the art will understand that it does not necessarily have to be completely pulled out in order to free the shaft end support 210. The user wishing to adjust the roller 160 to a lower position simply pulls out the bolts 234 and pushes the shaft 150 downwards. The pushing force causes the unit formed by the shaft 150, the roller 160 and the shaft end supports 210 to rotate with respect to the articulated first connection 230, and the shaft 150 to move along the arc-shaped slots 200. Once the unit has been rotated to its new position, the user only has to secure the bolts 234 back into a different pair of sidewall holes 240 matching the new position of the holes 340 of the shaft end supports 210. For instance, FIG. 6 shows the unit having been secured to a lower position in which the bolts 234 are fastened to the lowermost holes 240 on the sidewalls 130. The shaft end supports 210 could be adjusted to an additional intermediate position corresponding to the intermediate hole 240 on the sidewalls 130. The number of sidewall holes 240, and thus the number of discrete positions that the shaft end supports 210 can adopt, may vary.

As shown in the figures, the present embodiment further comprises a monitoring device 250 that is operatively attached to the shaft 150. The monitoring device 250 counts the number of rotations of the shaft 150, measures the angular velocity of the shaft 150, and/or measures the length of the cable 440 being rolled on the roller 160, and provides information on a display 254 for the user to be informed of the operation of rolling cable. This information may help assess the position of the cable 440 in the bore 410, the time required to extract the cable 440 from the bore 410, the depth of the bore 410, or other parameters that can be relevant in underground electrical wiring maintenance.

Figure 7:
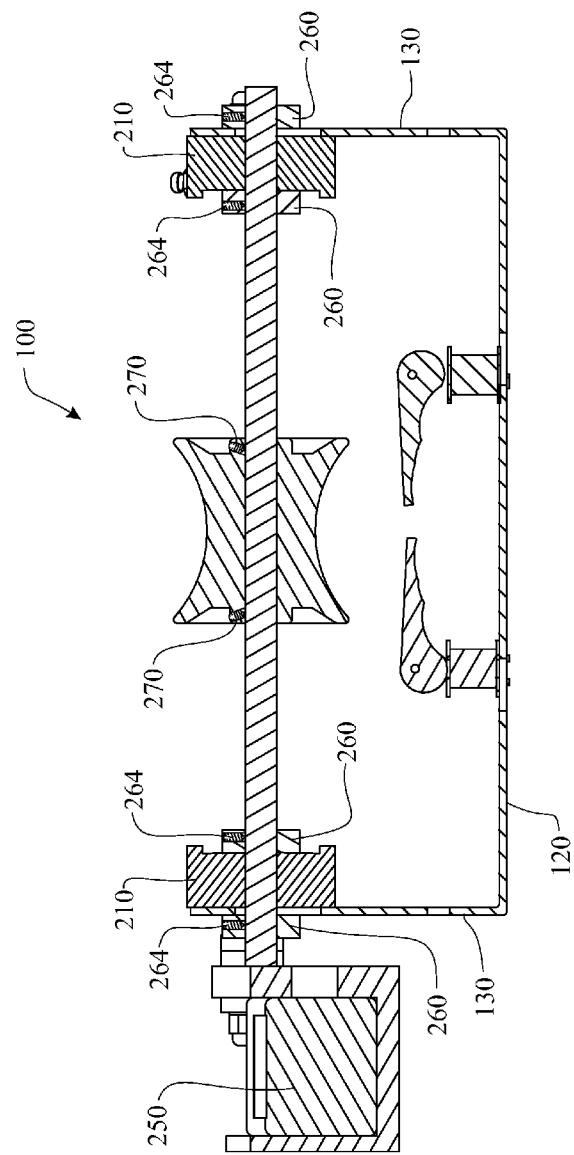
FIG. 7 presents a cross-sectional view of the cable distribution assembly of FIG. 1, according to cross-sectional plane 7-7 indicated in FIG. 4.

The illustration of FIG. 7 presents a cross-sectional view of the cable distribution assembly 100 according to cross-sectional plane 7-7 indicated in FIG. 4. As shown, the cable distribution assembly 100 further comprises two pairs of longitudinal stoppers 260 on each end of the shaft 150. Each pair of longitudinal stoppers 260 embraces a sidewall 130 and a shaft end support 210. Each longitudinal stopper 260 is fixed to the shaft 150 by a radial fastener 264 that slightly bites into the shaft 150. Thus, the longitudinal stoppers 260 are rotatable jointly with the shaft 150, and also prevent the shaft 150 from moving longitudinally when the cable is being rolled, increasing durability of the cable distribution assembly 100. The figure also shows that, in the present embodiment, the roller 160 is similarly coupled to the shaft 150 by two radial fasteners 270, so that the roller 160 rotates jointly with the shaft 150.

Figure 8:
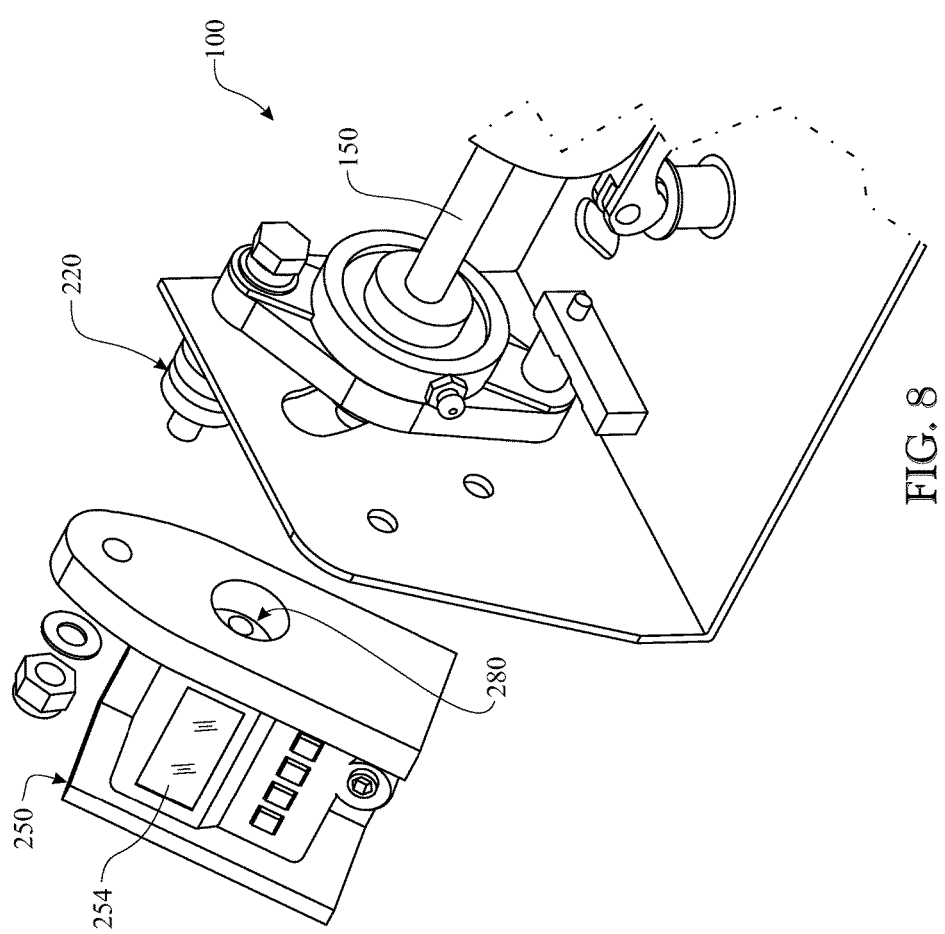
FIG. 8 presents a partial perspective view of the assembly of FIG. 1, showing the monitoring device in a partially exploded view.

The drawing of FIG. 8 shows a partial exploded view of the monitoring device 250 comprised in the cable distribution assembly 100 of the present embodiment. As shown, the monitoring device 234 is connected to the articulated first connection 220 so that its position is rotatably adjustable around said first connection 220 just as the shaft's 150 is. In addition, the monitoring device 250 includes an aperture 280 through which the shaft 150 couples internally to the monitoring device 250.

While the cable distribution assembly 100 is especially indicated for rolling cables through bores on the ground or other horizontal surfaces, the invention could be used for rolling cables in different scenarios. For example, the assembly could be attached to inclined surfaces or even on vertical surfaces, for which additional securing elements such as a hook system could optionally be included to better secure the base to the surface. In another example, the cable distribution assembly 100 could be used to lay underwater cable 440 for telecommunications, electric power transmission, or other purposes. In this embodiment, the cable distribution assembly 100 could rest on a ship or submarine.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A cable distribution assembly for controllably passing a cable through a bore on the ground or other surface, said cable distribution assembly comprising:
    a support portion comprising a base supporting a pair of sidewalls spaced apart one from the other, one edge of said base extending between said sidewalls defining a concave contour, said concave contour delimiting an inner space within;
    a shaft extending between said sidewalls and rotatable with respect to said support portion about a longitudinal axis; and
    a roller, coupled to said shaft and rotatable with respect to said support portion; wherein
    said roller and said shaft are positioned such that a vertical line tangent to a central portion of said roller lies within said inner space delimited by said concave contour defined by said base.

2. The cable distribution assembly according to claim 1, wherein said roller is affixed to said shaft and is jointly rotatable therewith with respect to said support portion.

3. The cable distribution assembly according to claim 2, wherein said position of said shaft and said roller are adjustable with respect to said base.

4. The cable distribution assembly according to claim 2, wherein said position of said shaft and said roller are vertically adjustable with respect to said base.

5. The cable distribution assembly according to claim 1, wherein said position of said shaft and said roller are horizontally adjustable with respect to said base in a direction substantially perpendicular to said axis of rotation of said shaft.

6. The cable distribution assembly according to claim 1, wherein each said sidewall defines a respective slot through which said shaft passes and further wherein said position of said shaft is adjustable within said slots.

7. The cable distribution assembly according to claim 6, wherein said slots are arcuate.

8. The cable distribution assembly according to claim 1, further including a shaft end support on each end of said shaft, each shaft end support having an articulated first connection to a respective said sidewall and a second connection engageable to different portions of said sidewall.

9. The cable distribution assembly according to claim 1, wherein said base defines at least one hole therethrough proximate to a periphery of said concave contour for the insertion of fasteners to attach said base to a matching peripheral hole of the bore in the ground for securing said support portion to an edge of the bore.

10. The cable distribution assembly according to claim 1, further including a monitoring device operably connected to said shaft and configured to measure at least one parameter of a group consisting of a number of shaft rotations, angular velocity of said shaft, and length of a cable dynamically passed over said roller.

11. The cable distribution assembly according to claim 1, wherein the roller comprises an external cable-retaining concave surface.

12. The cable distribution assembly according to claim 1, wherein said roller has an outer non-slip surface.

13. A cable distribution assembly for controllably passing a cable through a bore in or other surface includes a the ground or other surface, said cable distribution assembly comprising:
   a support portion comprising a base supporting a pair of sidewalls spaced apart one from the other, each said sidewall defining a slot therein and wherein one edge of said base extending between said sidewalls defines a concave contour delimiting an inner space within;
   a shaft extending between and adjustable within said slots defined in said sidewalls and rotatable with respect to said support portion about a longitudinal axis;
   a shaft end support on each end of said shaft, each shaft end support having an articulated first connection to a respective said sidewall and a second connection engageable to different portions of said sidewall; and
   a roller, affixed to said shaft and rotatable with respect to said support portion; wherein
   said roller and said shaft are positioned such that a vertical line tangent to a central portion of said roller lies within said inner space delimited by said concave contour defined by said base.

14. The cable distribution assembly according to claim 13, wherein said slots are arcuate.

15. The cable distribution assembly according to claim 13, wherein said base defines at least one hole therethrough proximate to a periphery of said concave contour for the insertion of fasteners to attach said base to a matching peripheral hole of the bore in the ground for securing said support portion to an edge of the bore.

16. The cable distribution assembly according to claim 13, further including a monitoring device operably connected to said shaft and configured to measure at least one parameter of a group consisting of a number of shaft rotations, angular velocity of said shaft, and length of a cable dynamically passed over said roller.

17. A cable distribution assembly for controllably passing a cable through a bore in the ground or other surface, said cable distribution assembly comprising:
   a support portion comprising a base supporting a pair of sidewalls spaced apart one from the other, one edge of said base extending between said sidewalls and defines a concave contour, said concave contour delimiting an inner space within, each said sidewall defining an arcuate slot therein;
   a shaft extending between and adjustable within said slots defined in said sidewalls and rotatable with respect to said support portion about a longitudinal axis;
   a shaft end support on each end of said shaft, each shaft end support having an articulated first connection to a respective said sidewall and a second connection engageable to different portions of said sidewall;
   a roller, affixed to said shaft and rotatable with respect to said support portion wherein said roller and said shaft are positioned such that a vertical line tangent to a central portion of said roller lies within said concave contour defined by said base; and
   a monitoring device operably connected to said shaft and configured to measure at least one parameter of a group consisting of a number of shaft rotations, angular velocity of said shaft, and length of a cable dynamically passed over said roller.

18. The cable distribution assembly according to claim 17, wherein said second connection includes a bolt passing through a hole defined by said shaft end support and further passing through a selected one of a plurality of holes defined in a respective said sidewall for regulating said shaft in different positions.

19. The cable distribution assembly according to claim 17, wherein said base defines at least one hole therethrough proximate to a periphery of said concave contour for the insertion of fasteners to attach said base to a matching peripheral hole of the bore in the ground for securing said support portion to an edge of the bore.

20. The cable distribution assembly according to claim 17, wherein said roller has an outer non-slip concave surface.

* * * * *